Patented Nov. 15, 1932

1,888,003

UNITED STATES PATENT OFFICE

NILS C. LINDBERG, OF CRETE, ILLINOIS, ASSIGNOR TO VICTOR CHEMICAL WORKS, A CORPORATION OF ILLINOIS

METHOD FOR THE CONVERSION OF FERROPHOSPHORUS

No Drawing. Application filed December 16, 1929. Serial No. 414,596.

The present invention relates to improvements in the utilization of ferrophosphorus, and more particularly to the production therefrom of useful phosphorus-containing compounds readily separable from the iron content of the ferrophosphorus. The present invention is an improvement upon the process described in the application of Benjamin Toubes, Serial No. 396,017, filed September 28, 1929.

In accordance with the present process, the ferrophosphorus, in comminuted form, is admixed and caked or briquetted with a suitable reacting proportion of an alkali metal carbonate, such as sodium carbonate, with which may be incorporated, if desired, minor proportions of a caustic alkali, such as caustic soda. The mixture is formed into briquettes or cakes of more or less uniform character, and is then subjected to heating at a temperature below the fusion point of the mixture. The briquettes retain their form, and consequently, if desired, the heating may be effected in rotary kilns or other suitable economical heating devices, preferably with an oxidizing flame. The briquettes disintegrated by the reaction, may be readily leached for removal of the soluble phosphate product and its separation from the insoluble iron product.

In carrying out the reaction, the ferrophosphorus, preferably comminuted, for example, to 200 mesh, is mixed with soda ash or with a mixture of soda ash and a minor proportion (not over 50%) of caustic soda. The reacting proportions vary, of course, with the proportion of phosphorus in the ferrophosphorus, which in ordinary practice will range from 18 to 26% phosphorus. It is preferred to use an excess of the alkali reagents.

The mixture may be briquetted in ordinary briquetting machines or may be formed into cakes by very slightly moistening a mass of the mixture, for example, with a very fine spray of water, and permitting the wet mixture to set. It thereupon forms a coherent mass, which may be broken up into irregular pieces or cakes which may be subjected to the reaction in the same manner as briquettes.

It will be understood that in the specification and claims hereinafter, when the term is employed, it is intended to include such coherent masses or cakes of the reaction mixture, both regular and irregular.

The briquettes are heated, but not to a temperature sufficient to cause melting of the mass. Sintering may occur, particularly when caustic alkali is present. Substantially complete conversion is effected, even with sodium carbonate in the absence of caustic alkali, at temperatures as low as 800 to 900° C. and effective recovery may be secured at even lower temperatures, say 600 to 700° C., particularly when caustic alkali is present. A temperature of 900 to 1000° C. is preferred for the conduct of the reaction.

In the reaction, as stated in the Toubes application hereinbefore referred to, the phosphorus is converted to soluble alkaline phosphates and the iron to insoluble iron oxide. In carrying out the operation in accordance with the present invention, the reaction is more readily controllable, as the exothermic nature of the reaction does not substantially affect the course of the reaction. The briquettes retain their formed character, but have an increased porosity, due to the liberation of gas, and are hence readily leached for the removal and separation of the phosphate compound. The product from briquettes containing caustic alkali are somewhat more porous and more readily leached than those produced from briquettes containing sodium carbonate alone.

Satisfactory results have been produced in accordance with the present invention by the use of sodium carbonate alone with the ferrophosphorus in reacting proportions, preferably with a slight excess of the alkali, and by replacing various proportions of the sodium carbonate with equivalent proportions of sodium hydroxide, based on sodium oxide equivalence. Thus, in a series of operations with ferrophosphorus containing 25.3% phosphorus, ground to 200 mesh, the following proportions of reacting constituents were employed to each 408 parts by weight of ferrophosphorus in a series of operations.

1. 544 parts soda ash.

2. 490 parts soda ash and 42 parts of powdered caustic soda (about 76% $Na_2O$).

3. 408 parts soda ash and 104 parts powdered caustic.

4. 362 parts soda ash and 138 parts powdered caustic.

5. 272 parts soda ash and 207 parts powdered caustic.

In this series of operations, it will be noted that in those succeeding the first operation, the caustic is substituted on the basis of sodium oxide equivalence, for about $\frac{1}{10}$, $\frac{1}{4}$, $\frac{1}{3}$ and $\frac{1}{2}$ of the soda ash sodium oxide respectively.

The briquettes formed with these reaction mixtures were subjected to identical conditions of heating at about 1000° C., and substantially quantitative conversion was secured in each case without melting of or deformation of the briquettes, there being some sintering in the briquettes containing caustic.

In carrying out the reaction, the sodium carbonate and caustic soda, as referred to hereinbefore, may be replaced in whole or in part by the carbonates or hydroxides of other alkali metals.

I claim:

1. The method of utilizing ferrophosphorus and securing separable phosphorus compounds therefrom which comprises forming briquettes comprising comminuted ferrophosphorus, alkali metal carbonate and caustic alkali, and heating the briquettes to a reacting temperature below the fusion temperature thereof.

2. The method of utilizing ferrophosphorus and securing separable phosphorus compounds therefrom which comprises forming briquettes containing comminuted ferrophosphorus, soda ash and caustic soda and heating such briquettes to a reacting temperature below fusion temperature.

3. The method of utilizing ferrophosphorus and securing separable phosphorus compounds therefrom which comprises forming briquettes containing comminuted ferrophosphorus, soda ash, and caustic soda, the latter being in quantity sufficient to provide from $\frac{1}{10}$ to $\frac{1}{2}$ of the alkaline equivalent of the alkaline constituents, and heating the mixture to a reaction temperature below fusion temperature.

NILS C. LINDBERG.